(12) United States Patent
Sartori et al.

(10) Patent No.: US 10,154,442 B2
(45) Date of Patent: Dec. 11, 2018

(54) SYSTEM AND METHOD FOR WIRELESS LINK CONFIGURATION

(75) Inventors: Philippe Sartori, Algonquin, IL (US);
Zhongfeng Li, Shanghai (CN);
Anthony C. K. Soong, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 906 days.

(21) Appl. No.: 13/348,981

(22) Filed: Jan. 12, 2012

(65) Prior Publication Data

US 2013/0182633 A1 Jul. 18, 2013

(51) Int. Cl.
*H04W 36/00* (2009.01)
*H04W 88/04* (2009.01)
*H04W 84/04* (2009.01)

(52) U.S. Cl.
CPC ...... *H04W 36/0055* (2013.01); *H04W 84/047* (2013.01); *H04W 88/04* (2013.01)

(58) Field of Classification Search
CPC ..... H04W 36/30; H04W 28/06; H04W 36/38; H04W 92/18; H04W 88/04; H04W 36/0055; H04W 84/047
See application file for complete search history.

(56) References Cited

U.S. PATENT DOCUMENTS

| 2004/0224690 | A1* | 11/2004 | Choi et al. ...................... 455/436 |
| 2007/0255834 | A1* | 11/2007 | Abhishek et al. ............ 709/226 |
| 2010/0113027 | A1* | 5/2010 | Hsu ................................. 455/436 |
| 2011/0194407 | A1* | 8/2011 | Ji et al. .......................... 370/226 |
| 2012/0069795 | A1* | 3/2012 | Chung et al. .................. 370/315 |
| 2012/0083199 | A1* | 4/2012 | Redana et al. ..................... 455/7 |
| 2012/0113959 | A1* | 5/2012 | Sugizaki et al. ............... 370/331 |
| 2012/0140700 | A1* | 6/2012 | Huang ............................ 370/315 |
| 2012/0252355 | A1* | 10/2012 | Huang et al. ...................... 455/7 |
| 2012/0315916 | A1* | 12/2012 | Van Phan et al. ............. 455/442 |
| 2012/0322451 | A1* | 12/2012 | Hsu ................................ 455/436 |
| 2013/0084865 | A1* | 4/2013 | Agrawal et al. .............. 455/436 |
| 2013/0178210 | A1* | 7/2013 | Wang et al. ................... 455/436 |
| 2013/0183971 | A1* | 7/2013 | Tamaki et al. ................ 455/436 |
| 2013/0303171 | A1* | 11/2013 | Jang et al. ..................... 455/436 |

(Continued)

OTHER PUBLICATIONS

"3$^{rd}$ Generation Partnership Project; Technical Specification Group Radio Access Network; Evolved Universal Terrestrial Radio Access (E-UTRA); Physical layer for relaying operation (Release 10)," 3GPP TS 36.216, V10.2.0, Mar. 2011, 16 pages.

(Continued)

*Primary Examiner* — Khaled M Kassim
(74) *Attorney, Agent, or Firm* — Slater Matsil, LLP

(57) ABSTRACT

A method for operating a relay node during a handoff from a first controller to a second controller includes receiving a first instruction from the first controller to discontinue using a first set of wireless backhaul link resources allocated to the relay node by the first controller and to temporarily use a second set of wireless backhaul link resources dedicated by the second controller. The method also includes receiving a second instruction from the second controller to discontinue using the second set of wireless backhaul link resources and to begin using a third set of wireless backhaul link resources allocated to the relay node by the second controller.

10 Claims, 8 Drawing Sheets

(56) References Cited

U.S. PATENT DOCUMENTS

2013/0316712 A1* 11/2013 Lee et al. .................. 455/436

OTHER PUBLICATIONS

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.2.0, Jun. 2011, 120 pages.

* cited by examiner

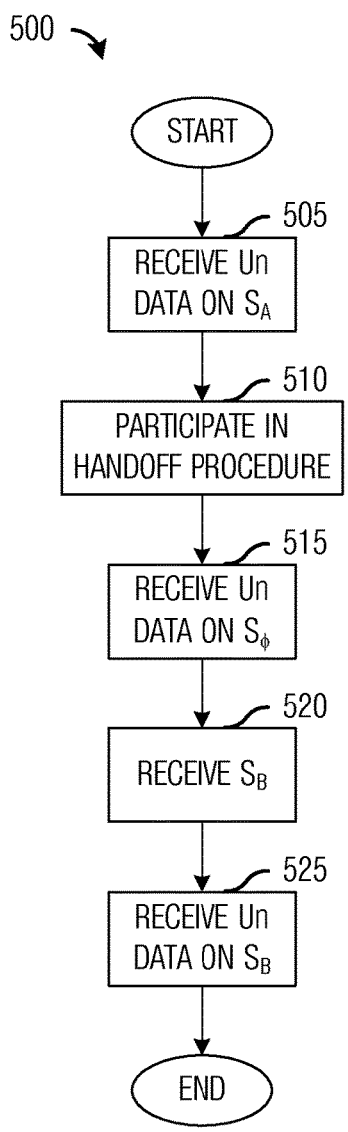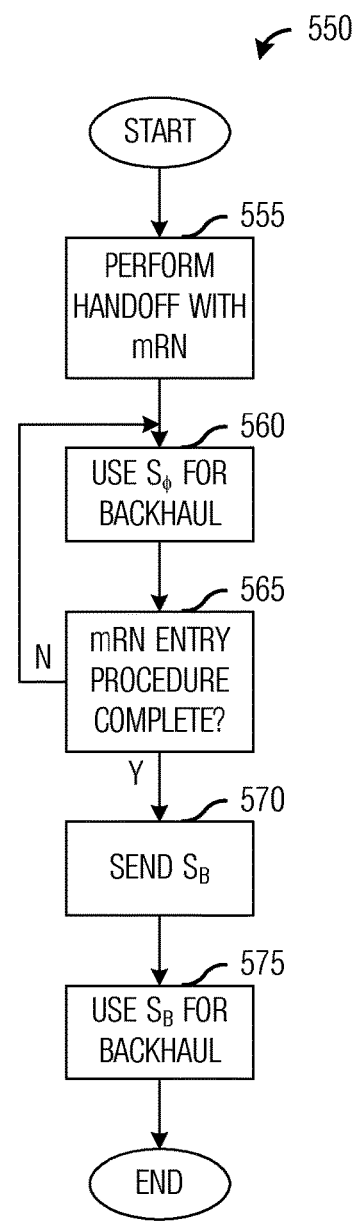
Fig. 5a
Fig. 5b

SYSTEM AND METHOD FOR WIRELESS LINK CONFIGURATION

TECHNICAL FIELD

The present invention relates generally to digital communications, and more particularly to a system and method for wireless link configuration.

BACKGROUND

Within the context of the Third Generation Partnership Project (3GPP) Long Term Evolution (LTE) Release 10, Relay Nodes (RNs) are standardized. Generally, RNs are network nodes that communicate with an enhanced NodeB (eNB), which may also be commonly referred to as a communications controller, a base station, a NodeB, a controller, and the like, through a wireless link referred to as a Un link or a wireless backhaul, which may be in-band or out-of-band. To a User Equipment (UE), which may also be commonly referred to as a mobile station, terminal, subscriber, user, and the like, the RNs may appear as eNBs. The RNs are considered to be tools to improve, e.g., the coverage area of high data rate communications, group mobility, temporary network deployment, the cell-edge throughput, and/or to provide coverage in new areas.

Typically, there may be two types of RNs: fixed RNs and mobile RNs (mRNs). As their names imply, a fixed RN may be deployed in a fixed location and serve UEs operating within its operating area, while a mRN may be deployed in a mobile location and serve UEs operating with its moving operating area. The UEs operating within the moving operating area of the mRN may be moving along with the mRN or moved into the moving operating area of the mRN.

SUMMARY OF THE INVENTION

Technical advantages are generally achieved by embodiments of the present invention which provide a system and method for wireless link configuration.

In accordance with an example embodiment of the present invention, a method for operating a relay node during a handoff from a first controller to a second controller is provided. The method includes receiving a first instruction from the first controller to discontinue using a first set of wireless backhaul link resources allocated to the relay node by the first controller and to temporarily use a second set of wireless backhaul link resources dedicated by the second controller. The method also includes receiving a second instruction from the second controller to discontinue using the second set of wireless backhaul link resources and to begin using a third set of wireless backhaul link resources allocated to the relay node by the second controller.

In accordance with another example embodiment of the present invention, a method for operating a method for operating a target controller during a handoff of a relay node is provided. The method includes receiving the handoff of the relay node from a source controller, and instructing the relay node to temporarily use a first set of wireless backhaul link resources dedicated by the target controller upon completion of the handoff. The method also includes transmitting an allocation of a second set of wireless backhaul link resources to the relay node.

In accordance with another example embodiment of the present invention, a relay node is provided. The relay node includes a receiver, and a processor operatively coupled to the receiver. The receiver receives a first instruction from a first controller to discontinue using a first set of wireless backhaul link resources allocated to the relay node by the first controller and to temporarily use a second set of wireless backhaul link resources dedicated by a second controller, and receives a second instruction from the second controller to discontinue the use of the second set of wireless backhaul link resources and to begin the use of a third set of wireless backhaul link resources allocated to the relay node by the second controller. The processor temporarily uses the second set of wireless backhaul link resources dedicated by the second controller, and uses the third set of wireless backhaul link resources allocated to the relay node by the second controller.

In accordance with another example embodiment of the present invention, a communications controller is provided. The communications controller includes a processor, and a transmitter operatively coupled to the processor. The processor receives a handoff of a relay node from a source controller, and instructs the relay node to temporarily use a first set of wireless backhaul link resources dedicated by the communications controller upon completion of the handoff. The transmitter transmits an allocation of a second set of wireless backhaul link resources to the relay node.

In accordance with another example embodiment of the present invention, a method for operating a relay node during a handoff from a source controller to a target controller is provided. The method includes receiving, from a source controller, backhaul link information including an allocation of a target set of wireless backhaul link resources of the target controller dedicated for use of the relay node upon completion of the handoff. The method also includes receiving backhaul link data from the target controller over the target set of wireless backhaul link resources.

In accordance with another example embodiment of the present invention, a method for operating a target controller during a handoff of a relay node is provided. The method includes transmitting, to a source controller, backhaul link information including an allocation of a target set of wireless backhaul link resources dedicated for use by the relay node upon completion of the handoff. The method also includes transmitting, to the relay node, backhaul link data over the target set of wireless backhaul link resources.

In accordance with another example embodiment of the present invention, a relay node is provided. The relay node includes a receiver, and a processor operatively coupled to the receiver. The receiver receives, from a source controller, backhaul link information including an allocation of a target set of wireless backhaul link resources of a target controller dedicated for use of the relay node upon completion of a handoff, and receives backhaul link data from the target controller over the target set of wireless backhaul link resources. The processor processes the backhaul link data.

In accordance with another example embodiment of the present invention, a communications controller is provided. The communications controller includes a transmitter, and a processor operatively coupled to the transmitter. The transmitter transmits, to a source controller, backhaul link information including an allocation of a target set of wireless backhaul link resources dedicated for use by a relay node upon completion of a handoff, and transmits, to the relay node, backhaul link data over the target set of wireless backhaul link resources. The processor generates the backhaul link data.

One advantage of an embodiment is that mRN handovers between two eNBs (a source eNB and a target eNB) may occur rapidly without incurring significant delay that is typically required for configuring the backhaul link for the mRN in the target eNB. The delay may dramatically impact the performance of the mRN, especially in situations wherein the mRN is rapidly moving between eNBs, such as when the mRN is deployed on a high speed train.

A further advantage of an embodiment is that the rapid configuration of the backhaul link helps to increase the handoff success rate, especially in situations wherein the mRN is rapidly moving between eNBs.

BRIEF DESCRIPTION OF THE DRAWINGS

For a more complete understanding of the present invention, and the advantages thereof, reference is now made to the following descriptions taken in conjunction with the accompanying drawing, in which:

FIG. 5a illustrates an example flow diagram of mRN operations according to example embodiments described herein;

FIG. 5b illustrates an example flow diagram of eNB operations according to example embodiments described herein;

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to providing wireless backhaul link configuration information to a mRN during a handoff process. For example, at two eNBs (a source eNB and a target eNB) involved in the handoff, both eNBs may share at least some subframes (which may be referred to as wireless backhaul link resources) in their respective wireless backhaul link configurations. Therefore, the mRN may be able to immediately use at least a portion of the wireless backhaul link of the target eNB as soon as it finishes the handoff procedure instead of having to wait for the target eNB to provide its wireless backhaul link information. As another example, the target eNB may share its wireless backhaul link configuration with the source eNB, which in turn, provides the wireless backhaul link configuration of the target eNB to the mRN. The mRN may then make use of the wireless backhaul link configuration of the target eNB as soon as it finishes the handoff procedure instead of having to wait for the target eNB to provide its wireless backhaul link information.

The present invention will be described with respect to example embodiments in a specific context, namely a Third Generation Partnership Project (3GPP) Long Term Evolution (LTE) compliant communications system that supports Relay Nodes (RNs) and handoffs for mobile RNs (mRN). The invention may also be applied, however, to other standards compliant, such as WiMAX, IEEE 802.16m, and the like, communications systems, as well as non-standards compliant communications systems that support RNs and handoffs for mRNs.

Figure 1:
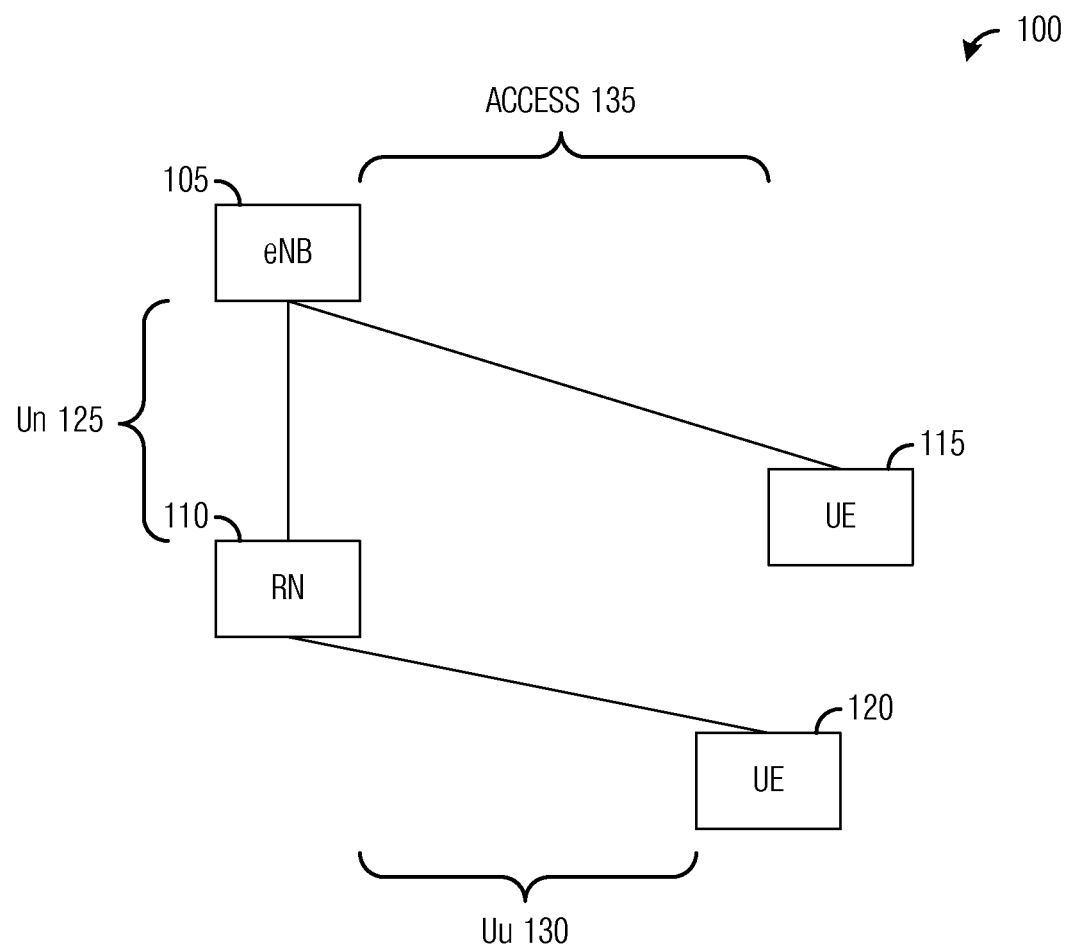
FIG. 1 illustrates an example first communications system according to example embodiments described herein.

FIG. 1 illustrates a first communications system 100. First communications system 100 includes an enhanced NodeB (eNB) 105, a relay node (RN) 110, a first User Equipment (UE) 115, and a second UE 120. While it is understood that communications systems may employ multiple eNBs capable of communicating with a number of UEs, only one eNB, two UEs, and one RN are illustrated for simplicity.

A RN (fixed or mobile) is generally considered as a tool to improve, e.g., the coverage area of high data rate communications, group mobility, temporary network deployment, the cell-edge throughput, and/or to provide coverage in new areas. The RN is wirelessly connected to a wireless communications network via an eNB, such as eNB 105.

UE 115 and UE 120 may be communications devices that allow an operator to connect to a service, such as voice service, data service, multimedia service, and the like. As shown in FIG. 1, eNB 105 has allocated some resources to RN 110, which in turn, may allocate some resources (provided by eNB 105) to UE 120. eNB 105 may also directly communicate with UEs. For example, eNB 105 directly allocates resources to UE 115. Communications between eNB 105 and RN 110 may be made over a communications link (uplink and/or downlink directions) referred to as a Un link 120 or a wireless backhaul link, while communications between RN 110 and UE 120 may be made over a communications link (uplink and/or downlink directions) referred to as a Uu link 130 or an access link. Communications between eNB 105 and UE 115 may be made over communications link referred to as access link 135.

Figure 2:
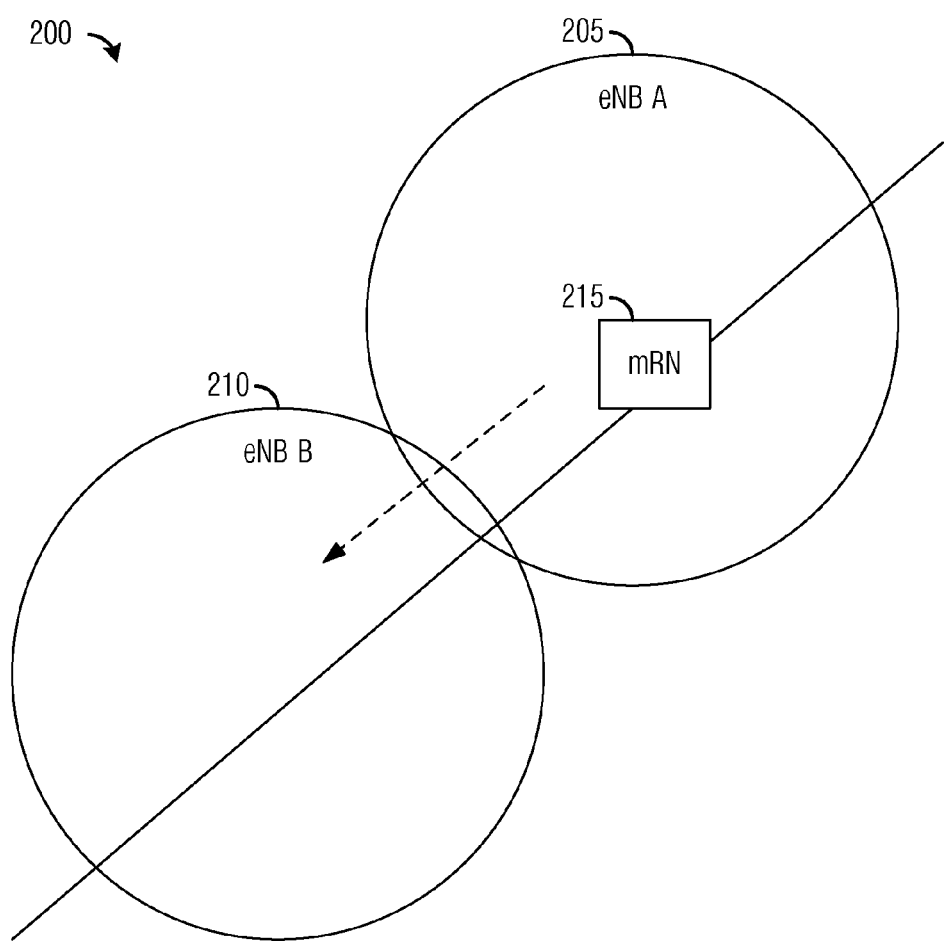
FIG. 2 illustrates an example portion of a communications system according to example embodiments described herein.

FIG. 2 illustrates a portion of a communications system 200. Communications system 200 includes a first eNB 205 (shown as eNB A) and a second eNB 210 (shown as eNB B). Communications system 200 also includes a mRN 215 that may be a mRN. For example, mRN 215 may be deployed on a rapidly moving bus, train, or the like. As mRN 215 moves around, it may move out of a coverage area of one eNB and into a coverage area of another eNB. As shown in FIG. 2, mRN 215 may move out of the coverage area of first eNB 205 and into the coverage area of second eNB 210.

In order to maintain a high level of service, the handoff between the eNBs may need to be fast, reliable, and as seamless as possible. An issue that is associated with an mRN handoff is that the Un link subframe allocation (i.e., the wireless backhaul link resources) may be different between the two eNBs involved in the handoff. For discussion purposes, the two eNBs involved in an mRN handoff may be referred to as a source eNB (the eNB currently serving the mRN as it moves out of the eNB's coverage area) and a target eNB (the eNB that will be serving the mRN after the handoff completes). The target eNB may also be referred to as a new serving eNB once the handoff completes.

Therefore, once the mRN completes the handoff process, it is not able to utilize the Un link (and operate as a RN) until it determines the Un link subframe allocation of its new serving eNB. Generally, obtaining the Un link subframe allocation may be a relatively lengthy process. The lengthy process may seriously impact the performance of the mRN for a high mobility mRN, such as one located on a high speed train, in particular. As an example, on a high speed train moving at approximately 300 kilometer per hour with cell diameters of 1 kilometer, the mRN switches eNBs about once every 12 ms. Therefore, there is only a small amount of time available for obtaining the Un link subframe allocation and provide adequate service. It is noted that the effect of having the mRN not communicating has an impact on many UEs (e.g., all the UEs communicating with the mRN). Therefore it is imperative to ensure a handoff process for the nRM as fast and as reliable as possible.

The Un link subframe allocation is described herein for a frequency division duplexed (FDD) communications system. Extending the Un link subframe allocation for a time division duplexed (TDD) communications system is straightforward and is not described in detail herein.

According to Section 5.2 of the 3GPP LTE Release-10 technical standards, the Un link subframe allocation has a 40 ms periodicity and subframes 0, 4, 5, and 9 may not be used as Un link subframes. Up to 8 basic subframe subsets may be allocated. Each basic subframe subset consists of 3 subframes per 40 ms period. A bitmap may be used to indicate which basic subframe subset(s) is (are) allocated. Table 1 displays the 8 basic subframe subsets.

TABLE 1

Basic subsets for Un link subframe allocation.

| 8-bit bitmap | | Patterns for Un link subframe allocation | DL subframes within 40 ms period | | | |
|---|---|---|---|---|---|---|
| | | | Frame N | Frame N + 1 | Frame N + 2 | Frame N + 3 |
| MSB | 8th bit | 0 | 8 | 6 | | 2 |
| | 7th bit | 1 | 1 | 7 | | 3 |
| | 6th bit | 2 | 2 | 8 | 6 | |
| | 5th bit | 3 | 3 | 1 | 7 | |
| | 4th bit | 4 | | 2 | 8 | 6 |
| | 3rd bit | 5 | | 3 | 1 | 7 |
| | 2nd bit | 6 | 6 | | 2 | 8 |
| LSB | 1st bit | 7 | 7 | | 3 | 1 |

Figure 3:
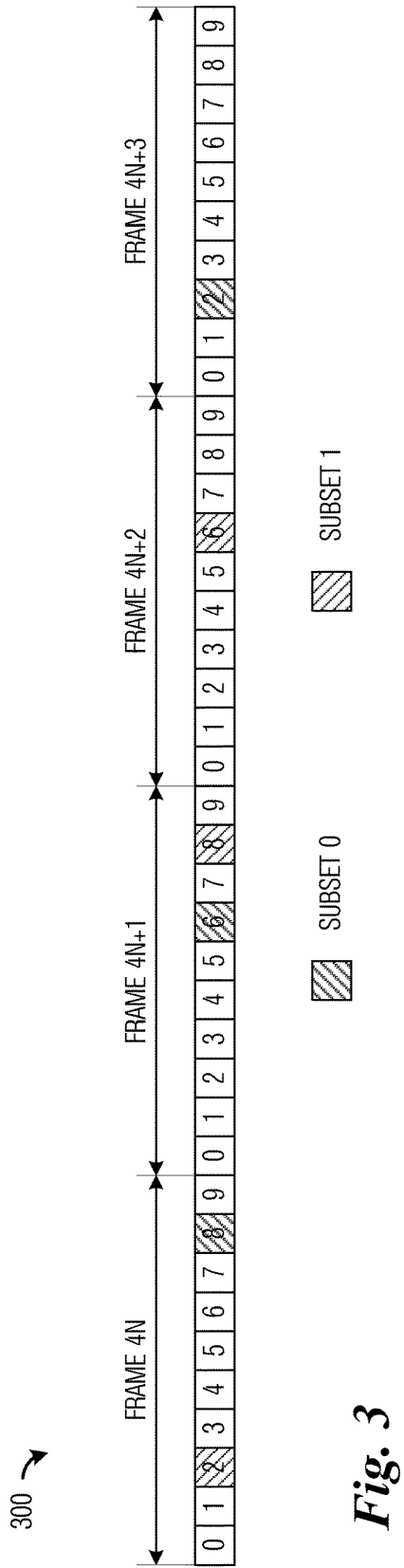
FIG. 3 illustrates an example sequence of frames according to example embodiments described herein.

FIG. 3 illustrates a sequence of frames 300. Sequence of frames 300 consists of four consecutive frames (frame 4N, frame 4N+1, frame 4N+2, and frame 4N+3). Each frame in sequence of frames 300 consists of 10 subframes numbered between 0 and 9. As shown in FIG. 3, some of the subframes in sequence of frames 300 may be allocated for a Un link with a bitmap 0x00000101, which indicates that basic subsets 0 and 2 are allocated for the Un link. Basic subset 0 means that subframe 8 in frame 4N, subframe 6 in frame 4N+1, and subframe 2 in frame 4N+3, are allocated for use as the Un link and basic subset 2 means that subframe 2 in frame 4N, subframe 8 in frame 4N+1, and subframe 6 in frame 4N+2 are allocated for use as the Un link.

According to an example embodiment, it may be possible to shorten an interval of time between completion of an mRN handoff between the source eNB and the target eNB and when the mRN may be able to begin utilizing the Un link by having the two eNBs have at least some common subframes in their respective Un link subframe allocations.

Figure 4:
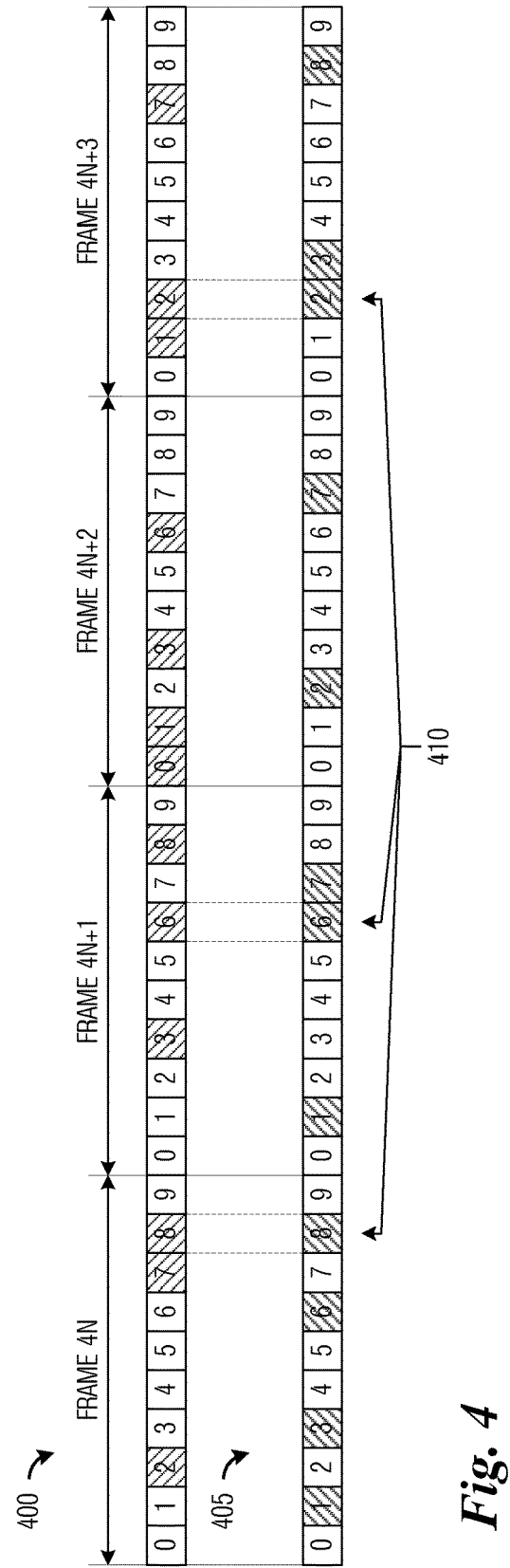
FIG. 4 illustrates example first sequence of frames and a second sequence of frames according to example embodiments described herein.

FIG. 4 illustrates a first sequence of frames 400 and a second sequence of frames 405. First sequence of frames 400 represents four frames highlighting a Un link subframe allocation for a source eNB and second sequence of frames 405 represents four frames highlighting a Un link subframe allocation for a target eNB. The Un link subframe allocation for the source eNB may be referred to as $S_A$, and the Un link subframe allocation for the target eNB may be referred to as $S_B$. Some of the subframes allocated for the Un link of the source eNB as shown in first sequence of frames 400 are also allocated for the Un link of the target eNB as shown in second sequence of frames 405, with the common subframes shown in FIG. 4 as subframes 410. The common subframes may also be referred to as a minimum Un link subframe allocation. The minimum Un link subframe allocation may be referred to as $S_\phi$, where $S_A \cap S_B = S_\phi$, $S_A \cap S_\phi = S_\phi$, and $S_B \cap S_\phi = S_\phi$. It is noted that in an extreme case, a single Un link subframe allocation (i.e., the minimum Un link subframe allocation) may be used in all of the eNBs.

The common subframes may be shared by all eNBs in a communications system or by a subset of all eNBs in the communications system and may be provided to the mRN through signaling, such as higher layer signaling. Since the mRN knows the common subframes, as soon as the handoff completes, the mRN may begin to operate as a RN by using the common subframes and the delay between the completion of the handoff and when the mRN may be able to begin utilizing the Un link may be small.

FIG. 5a illustrates a flow diagram of mRN operations 500. mRN operations 500 may be indicative of operations occurring in an mRN, such as mRN 215, prior to a handoff, during the handoff, and after the handoff between two eNBs.

Prior to the handoff, the mRN is being served by a source eNB and may be receiving (and sending on corresponding uplink subframes) Un data on subframes allocated for the Un link of the source eNB, i.e., $S_A$ (block 505). Since the mRN knows $S_A$, the mRN may receive the Un data without problems.

As the mRN moves about, it participates in the handoff with a target eNB (block 510). According to an example embodiment, the handoff is triggered by a message, e.g., a handoff initialization message, received from the source eNB. Since the source eNB and the target eNB share a minimum Un link subframe allocation, $S_\phi$, as soon as the handoff is complete, the mRN may begin to receive (and send on corresponding uplink subframes) Un data on $S_\phi$ from the target eNB (block 515). Therefore, there is very little delay between the completion of the handoff and the beginning of receiving the Un data.

According to an example embodiment, rather than using the minimum Un link subframe allocation, the mRN makes use of an agreed upon Un link subframe allocation, that may be indicated to the mRN during or after the handoff. As an example, the target eNB may have previously agreed to use a Un link subframe allocation for new mRNs after a handoff until the target eNB has had a chance to signal its actual Un link subframe allocation. Each eNB may have its own agreed upon Un link subframe allocation, which may be stored in the eNBs and signaled to the mRN during the handoff or immediately after the handoff. According to an alternative embodiment, the mRN may store its own information regarding the agreed upon Un link subframe allocations for the eNBs and utilizing information about the target eNB, the mRN determines the agreed upon Un link subframe allocation that it will use until the target eNB provides information about its actual Un link subframe allocation.

While the mRN is receiving the Un data on $S_\phi$, the target eNB may be signaling the mRN its entire Un link subframe allocation, $S_B$ (block 520). Once the mRN receives the Un link subframe allocation $S_B$ from the target eNB, the mRN may receive the Un data on the Un link subframe allocation $S_B$ of the target eNB (block 525). According to an example embodiment, the signaling of the entire Un link subframe allocation is an implicit instruction from the target eNB to the mRN to discontinue using the minimum Un link subframe allocation and begin to use the entire Un link subframe allocation. According to an alternative example embodiment, the target eNB sends an instruction to the mRN to instruct the mRN to discontinue using the minimum Un link subframe allocation and begin to use the entire Un link subframe allocation.

FIG. 5b illustrates a flow diagram of eNB operations 550. eNB operations 550 may be indicative of operations occurring in a target eNB, such as eNB B 210, during a handoff and after the handoff.

During the handoff, the target eNB and the mRN exchange signaling to complete the handoff (block 555). Once the handoff is complete, the target eNB may send Un data to the mRN over a minimum Un link subframe allocation, $S_\phi$, that is known by the mRN (block 560). According to an alternative embodiment, the target eNB may send the Un data to the mRN over an agreed upon Un link subframe allocation. Since the mRN knows the minimum Un link subframe allocation $S_\phi$ for the target eNB, the target eNB may not need to wait much time after the completion of the handoff before it sends the Un data.

The target eNB may also send its entire Un link subframe allocation $S_B$ to the mRN (block 570). Once it has sent the Un link subframe allocation $S_B$ to the mRN, the target eNB may use the Un link subframe allocation $S_B$ to send Un data to the mRN (block 575).

According to an example embodiment, it may be possible to shorten an interval of time between completion of an mRN handoff between two eNBs and when the mRN may be able to begin utilizing the Un link by having neighboring eNBs share their Un link subframe allocations.

Generally, when there is a change in the Un link subframe allocation (e.g., when the mRN switches from the source eNB's Un link subframe allocation, $S_A$, to the minimum Un link subframe allocation, $S_\phi$, and then to the target eNB's Un link subframe allocation, $S_B$) the number of Hybrid Automatic Repeat Requested (HARQ) processes may differ. Typically, if additional HARQ processes are needed, additional HARQ processes may be added without much difficulty.

However, when there are more active HARQ processes than needed, the additional unused HARQ processes may need to be addressed. Several different techniques may be used to address the additional unused HARQ processes.

1. Stop the additional unused HARQ processes. As an example, if while using the source eNB's Un link subframe allocation the mRN uses 4 HARQ processes and while using the minimum Un link subframe allocation the mRN uses 2 HARQ processes, the two unused HARQ processes may be stopped.

2. Suspend the additional unused HARQ processes. Suspending the additional unused HARQ processes may proceed as follows. Information regarding the Un link subframe allocation from the source eNB may be transferred to the target eNB (e.g., using the backhaul). Then, when switching from the minimum Un link subframe allocation to the target eNB's Un link subframe allocation, the suspended additional unused HARQ processes may be resumed.

3. Operate conservatively or do not use HARQ at all when a handoff (which may be predictable based on operating conditions of the mRN or in high speed environments) is imminent. Once the handoff completes, the mRN may resume normal operation and use HARQ.

4. Leave the additional unused HARQ processes for implementers of mRNs.

It is noted that in a handoff (or when using the minimum Un link subframe allocation), even if the number of HARQ processes remain unchanged, the timing of the HARQ processes may be different. However, the differences in the timing of the HARQ processes may not be a problem since the mRN may unequivocally determine the subframe mapping of the HARQ processes.

Figure 6:
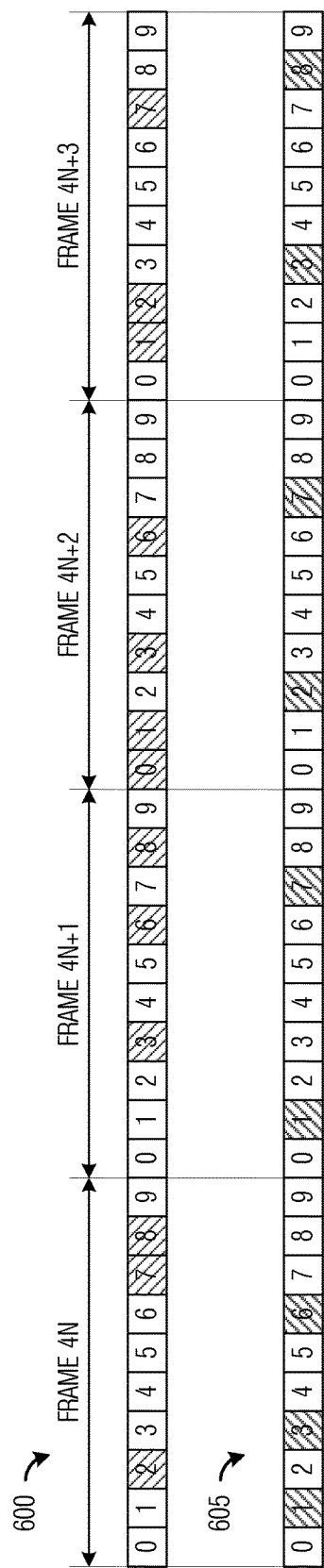
FIG. 6 illustrates example first sequence of frames and a second sequence of frames according to example embodiments described herein.

FIG. 6 illustrates a first sequence of frames 600 and a second sequence of frames 605. First sequence of frames 600 represents four frames highlighting a Un link subframe allocation for a source eNB and second sequence of frames 605 represents four frames highlighting a Un link subframe allocation for a target eNB. As shown in FIG. 6, the Un link subframe allocation of the source eNB may not have any subframes in common with the Un link subframe allocation of the target eNB. Although shown in FIG. 6 as not having any subframes in common, the Un link subframe allocation of the source eNB may have some subframes in common with the Un link subframe allocation of the target eNB. However, the common subframes may not have been intentional.

Figure 7:
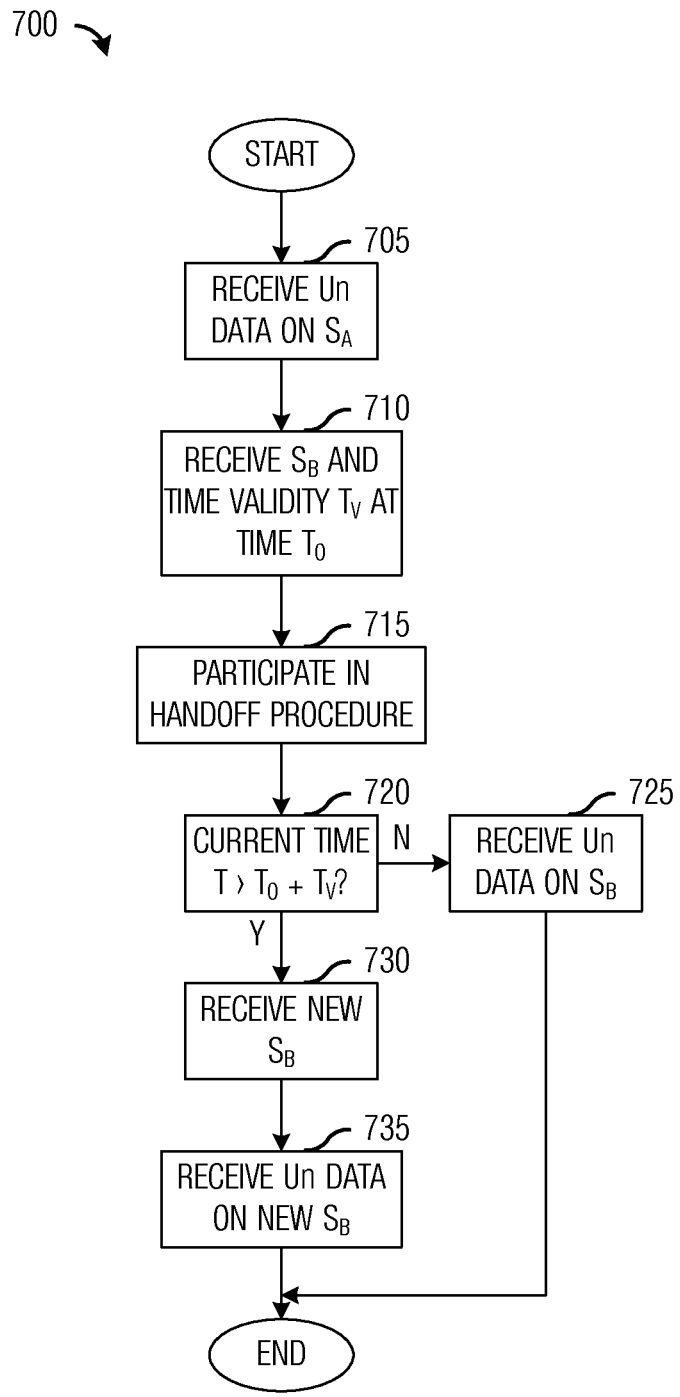
FIG. 7 illustrates an example flow diagram of mRN operations according to example embodiments described herein.

FIG. 7 illustrates a flow diagram of mRN operations 700. mRN operations 700 may be indicative of operations occurring in an mRN, such as mRN 215, prior to a handoff, during the handoff, and after the handoff between two eNBs.

Prior to the handoff, the mRN is being served by a source eNB and may be receiving (and sending on corresponding uplink subframes) Un data on subframes allocated for the Un link of the source eNB, i.e., $S_A$ (block 705). Since the mRN knows $S_A$, the mRN may receive the Un data without problems.

As the mRN moves above, it may move into a periphery of a coverage area of the source eNB. As a result, operating conditions of the mRN may indicate to the source eNB that it is about to move out of the coverage area of the source eNB and as a result, trigger a handoff from the source eNB to a target eNB. The mRN may receive the Un link subframe allocation $S_B$ of the target eNB along with a time value (block 710).

According to an example embodiment, along with the Un link subframe allocation $S_B$ of the target eNB, the mRN may also receive a time value $T_V$ that indicates a duration of the validity of the Un link subframe allocation. The time value $T_V$ may be referred to as a validity duration. The target eNB may basically be ensuring the mRN that for the duration of $T_V$, the target eNB will not change its Un link subframe allocation $S_B$, i.e., the Un link subframe allocation $S_B$ will remain valid for the duration of $T_V$. However, once the duration $T_V$ expires, the target eNB may no longer be able to ensure that it will not change its Un link subframe allocation $S_B$.

The mRN may participate in a handoff between the source eNB and the target eNB (block 715). Once the handoff completes, the mRN may perform a check to determine if the duration $T_V$ has elapsed since it received the Un link subframe allocation from the target eNB (block 720). As an example, the mRN may check to determine if the duration $T_V$ has elapsed by comparing the current time T with when the duration $T_V$ expires, e.g., $T>T_0+T_V$, where $T_0$ represents a time when the mRN received the Un link subframe allocation of the target eNB.

If the duration $T_V$ has not expired, the mRN may receive Un data using the Un link subframe allocation $S_B$ of the target eNB (block 725). However, if the duration $T_V$ has expired, then the mRN may not be ensured that the Un link subframe allocation of the target eNB has not changed and therefore, the mRN may need to obtain the Un link subframe allocation (new $S_B$) from the target eNB (block 730). Once the mRN has obtained the Un link subframe allocation (new $S_B$) from the target eNB, the mRN may receive Un data using the Un link subframe allocation (new $S_B$) from the target eNB (block 735).

Figure 8A:
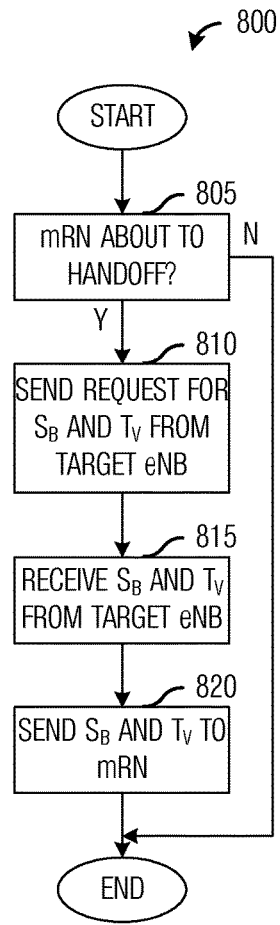
FIG. 8a illustrates an example flow diagram of eNB operations in providing Un link subframe allocation to an mRN according to example embodiments described herein.

FIG. 8a illustrates a flow diagram of eNB operations 800 in providing Un link subframe allocation to an mRN. eNB operations 800 may be indicative of operations occurring in a source eNB, such as eNB A 205, as the source eNB is serving an mRN that may be moving out of a coverage area of the source eNB.

As the mRN moves about the coverage area of the source eNB, the mRN may reach the periphery of the coverage area. As a result, operating conditions of the mRN may indicate to the source eNB that a handoff with a target eNB is needed. The source eNB may perform a check to determine if the mRN needs to handoff (block 805).

If the mRN needs to handoff to the target eNB, the identity of which the source eNB may be able to determine based on a location of the mRN and a direction in which it is moving, then the source eNB may request the target eNB's Un link subframe allocation $S_B$ and a duration $T_V$ for which the Un link subframe allocation will remain valid (block 810).

According to an example embodiment, in order to reduce Un link subframe allocation sharing overhead, the sharing of the Un link subframe allocation may be one way, from the target eNB of the handoff to the source eNB of the handoff. To further reduce the Un link subframe allocation sharing overhead, the source eNB may not request the Un link subframe allocation from the target eNB until a handoff is eminent or is already in process.

The source eNB may receive the Un link subframe allocation $S_B$ and the duration $T_V$ from the target eNB (block 815) and send the Un link subframe allocation $S_B$ and the duration $T_V$ to the mRN (block 820).

Figure 8B:
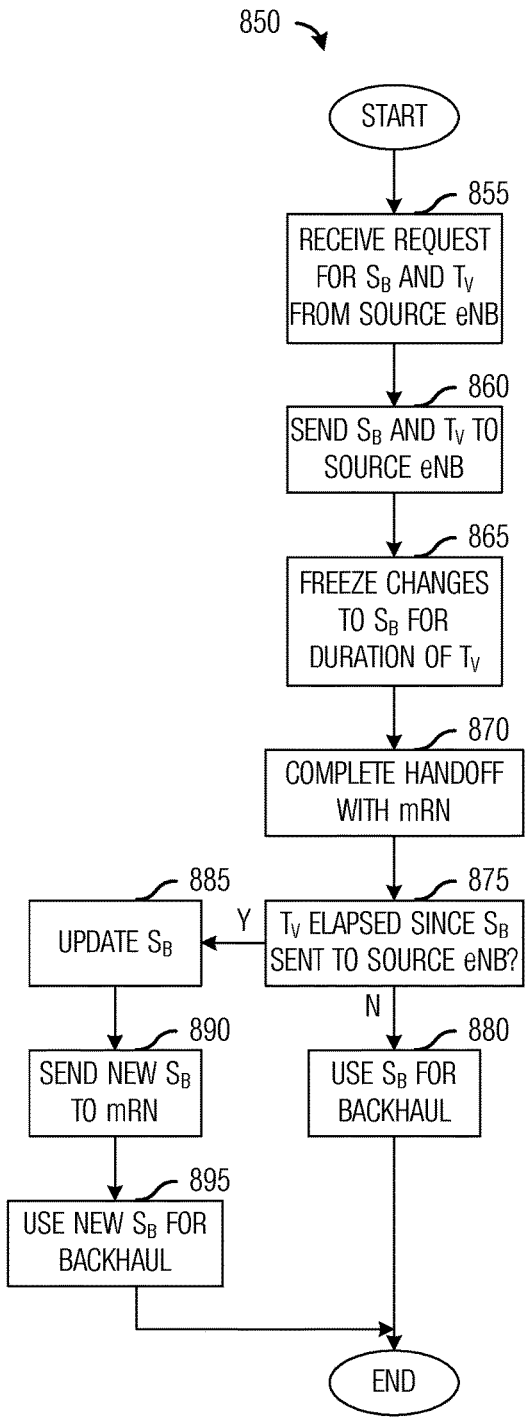
FIG. 8b illustrates an example flow diagram of eNB operations according to example embodiments described herein.

FIG. 8b illustrates a flow diagram of eNB operations 850. eNB operations 850 may be indicative of operations occurring in a target eNB, such as eNB B 210, prior to a handoff, during the handoff, and after the handoff.

Prior to the handoff, the target eNB may receive a request from a source eNB to provide the source eNB the target eNB's Un link subframe allocation $S_B$ and a duration $T_V$ during which the target eNB will not change its Un link subframe allocation (block 855). The value of the duration $T_V$ may be based on factors such as how long has it been since the last time the target eNB changed its Un link subframe allocation, Un link performance, Un link error rate, Un link utilization, a number of mRNs and RNs supported by the target eNB, and the like.

The target eNB provides to the source eNB its Un link subframe allocation $S_B$ and the duration $T_V$ (block 860). Until the duration $T_V$ expires, the target eNB does not changes its Un link subframe allocation $S_B$ (block 865).

During the handoff, the target eNB and the mRN exchange signaling to complete the handoff (block 870).

After the handoff is complete, the target eNB may perform a check to determine if the duration $T_V$ has elapsed since the target eNB sent the source eNB its Un link subframe allocation $S_B$ and the duration $T_V$ (block 875). If the duration $T_V$ has not elapsed, then the target eNB may use its Un link subframe allocation $S_B$ to send Un data to the mRN (block 880). While FIG. 8 illustrates an example embodiment wherein a timer is used during the handoff process, other mechanisms are possible, such as using a handshake process.

However, if the duration $T_V$ has elapsed, then the target eNB may update its Un link subframe allocation $S_B$ (block 885). It is noted that the update to the Un link subframe allocation may or may not change the Un link subframe allocation $S_B$. However, regardless if the Un link subframe allocation $S_B$ was changed in the update, the target eNB may send the Un link subframe allocation to the mRN, changed or unchanged (block 890) and the target eNB may use the Un link subframe allocation to send Un data to the mRN (block 895).

As with the solution utilizing the minimum Un link subframe allocation, the sharing of the target eNB's Un link subframe allocation may present a problem with additional unused HARQ processes during and after the handoff. The techniques previously presented for addressing the additional unused HARQ processes may also apply herein.

Figure 9:
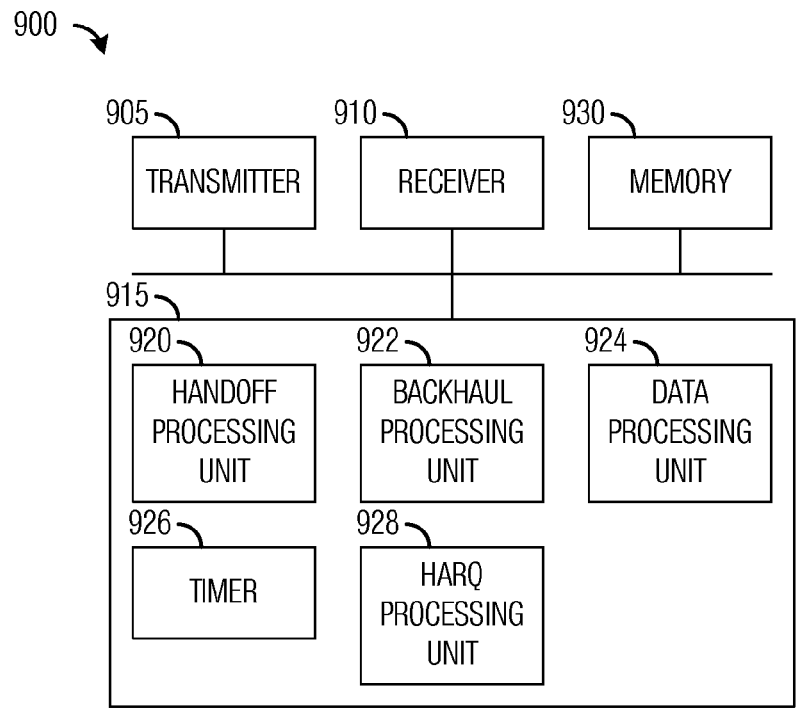
FIG. 9 illustrates an example communications device according to example embodiments described herein.

FIG. 9 illustrates a diagram of a communications device 900. Communications device 900 may be an implementation of a UE of a communications system. Communications device 900 may be used to implement various ones of the embodiments discussed herein. As shown in FIG. 9, a transmitter 905 is configured to send control channels, messages, information, and the like, and a receiver 910 is configured to receive messages, information, and the like. Transmitter 905 and receiver 910 may have a wireless interface, a wireline interface, or a combination thereof.

A handoff processing unit 920 is configured to generate messages to be sent to an eNB as well as process messages from eNBs involved in a handoff with communications device 900. A backhaul processing unit 922 is configured to determine which Un link subframe allocation to utilize to receive Un data from an eNB serving communications device 900. Backhaul processing unit 922 is further configured to determine whether or not to use the Un link subframe allocation or wait to receive a new Un link subframe allocation from the eNB. Backhaul processing unit 922 may determine between a full Un link subframe allocation or a minimum Un link subframe allocation of an eNB to use to receive the Un data. A data processing unit 924 is configured to process the Un data received from the eNB. A timer 926 is configured to determine if duration $T_V$ has elapsed since receiving the eNB's Un link subframe allocation. A HARQ processing unit 928 is configured to address HARQ process changes, such as unused HARQ processes, arising from switching the Un link subframe allocations occurring in a handoff. A memory 930 is configured to store the Un link subframe allocations (e.g., $S_A$, $S_B$, $S_\phi$, and the like), duration $T_V$, and the like.

The elements of communications device 900 may be implemented as specific hardware logic blocks. In an alternative, the elements of communications device 900 may be implemented as software executing in a processor, controller, application specific integrated circuit, or the like. In yet another alternative, the elements of communications device 900 may be implemented as a combination of software and/or hardware.

As an example, transmitter 905 and receiver 910 may be implemented as a specific hardware block, while handoff processing unit 920, backhaul processing unit 922, data processing unit 924, timer 926, and HARQ processing unit 928 may be software modules executing in a processor 915, such as a microprocessor, a digital signal processor, a custom circuit, or a custom compiled logic array of a field programmable logic array.

Figure 10:
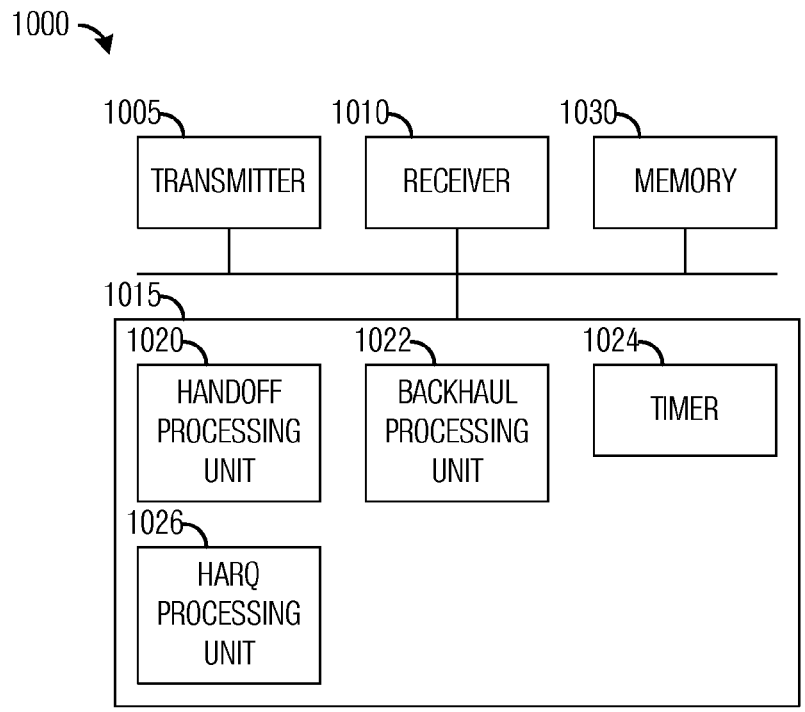
FIG. 10 illustrates an example communications controller according to example embodiments described herein.

FIG. 10 illustrates a diagram of a communications controller 1000. Communications controller 1000 may be an implementation of an eNB, a low power node, or the like, of a communications system. Communications controller 1000 may be used to implement various ones of the embodiments discussed herein. As shown in FIG. 10, a transmitter 1005 is configured to send control channels, messages, information, and the like, and a receiver 1010 is configured to receive messages, information, and the like. Transmitter 1005 and receiver 1010 may have a wireless interface, a wireline interface, or a combination thereof.

A handoff processing unit 1020 is configured to generate messages to be sent to a UE as well as process messages from the UE involved in a handoff with communications controller 1000. Handoff processing unit 1020 is also configured to send a request for a target eNB's Un link subframe allocation prior to or during a handoff. Handoff processing unit 1020 is also configured to send a response to a received request for the Un link subframe allocation of communications controller 1000. Handoff processing unit 1020 is also configured to determine a duration $T_V$ value.

A backhaul processing unit 1022 is configured to determine which Un link subframe allocation to utilize to send Un data to a UE. Backhaul processing unit 922 is may determine which Un link subframe allocation to utilize based on the duration $T_V$. Backhaul processing unit 1022 may determine when and/or how to update the Un link subframe allocation. A timer 1024 is configured to determine if duration $T_V$ has elapsed since responding to an eNB's request for the Un link subframe allocation of communications controller 1000. A HARQ processing unit 1026 is configured to address HARQ process changes, such as unused HARQ processes, arising from switching the Un link subframe allocations occurring in a handoff. A memory 1030 is configured to store the Un link subframe allocations, duration $T_V$, and the like.

The elements of communications controller 1000 may be implemented as specific hardware logic blocks. In an alternative, the elements of communications controller 1000 may be implemented as software executing in a processor, controller, application specific integrated circuit, or the like. In yet another alternative, the elements of communications controller 1000 may be implemented as a combination of software and/or hardware.

As an example, transmitter 1005 and receiver 1010 may be implemented as a specific hardware block, while handoff processing unit 1020, backhaul processing unit 1022, timer 1024, and HARQ processing unit 1026 may be software modules executing in a processor 1015, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a relay node during a handoff from a first controller to a second controller, the method comprising:
   receiving, by the relay node, a first instruction from the first controller to discontinue using a first set of wireless backhaul link resources allocated to the relay node by the first controller and to temporarily use a second set of wireless backhaul link resources dedicated by the second controller;
   temporarily using, by the relay node, the second set of wireless backhaul link resources in response to the first instruction;
   receiving, by the relay node, a second instruction from the second controller to discontinue using the second set of wireless backhaul link resources and to begin using a third set of wireless backhaul link resources allocated to the relay node by the second controller, wherein the second set of wireless backhaul link resources includes a minimum set of wireless backhaul link resources common to the first set of wireless backhaul link resources and the third set of wireless backhaul link resources; and
   using, by the relay node, the third set of wireless backhaul link resources in response to the second instruction.

2. The method of claim 1, wherein receiving the first instruction comprises receiving a handoff initialization message from the first controller.

3. The method of claim 1, wherein receiving the second instruction comprises receiving an allocation of the third set of wireless backhaul link resources from the second controller.

4. The method of claim 1, wherein the first controller and the second controller are part of a communications system including a plurality of further controllers, and wherein the minimum set of wireless backhaul link resources is common to a set of wireless backhaul link resources used by each of the further controllers.

5. The method of claim 1, wherein the second set of wireless backhaul link resources includes wireless backhaul link resources dedicated by both the first controller and the second controller.

6. A relay node comprising:
   a receiver of the relay node configured to receive a first instruction from a first controller to discontinue using a first set of wireless backhaul link resources allocated to the relay node by the first controller and to temporarily use a second set of wireless backhaul link resources dedicated by a second controller, and to receive a second instruction from the second controller to discontinue the use of the second set of wireless backhaul link resources and to begin the use of a third set of wireless backhaul link resources allocated to the relay node by the second controller, wherein the second set of wireless backhaul link resources includes a minimum set of wireless backhaul link resources common to the first set of wireless backhaul link resources and the third set of wireless backhaul link resources; and
   a processor of the relay node operatively coupled to the receiver, the processor configured to temporarily use the second set of wireless backhaul link resources dedicated by the second controller in accordance with the first instruction, and to use the third set of wireless backhaul link resources allocated to the relay node by the second controller in accordance with the second instruction.

7. The relay node of claim 6, wherein the receiver is configured to receive a handoff initialization message from the first controller.

8. The relay node of claim 6, wherein the receiver is configured to receive an allocation of the third set of wireless backhaul link resources from the second controller.

9. The relay node of claim 6, wherein the second set of wireless backhaul link resources includes wireless backhaul link resources dedicated by both the first controller and the second controller.

10. The relay node of claim 6, wherein the first controller and the second controller are part of a communications system including a plurality of further controllers, and wherein the minimum set of wireless backhaul link resources is common to a set of wireless backhaul link resources used by each of the further controllers.

* * * * *